United States Patent [19]

McPherson et al.

[11] Patent Number: 4,637,597

[45] Date of Patent: Jan. 20, 1987

[54] LOCKING POWER CLAMP

[75] Inventors: Alexander W. McPherson, Farmington, Mich.; Hazem N. Hamed, Torrance, Calif.

[73] Assignee: De-Sta-Co Division/Dover Corporation, Troy, Mich.

[21] Appl. No.: 628,244

[22] Filed: Jul. 6, 1984

Related U.S. Application Data

[63] Continuation-in-part of Ser. No. 427,176, Sep. 29, 1982, Pat. No. 4,458,889.

[51] Int. Cl.[4] .......... B23Q 3/03; B25B 1/04

[52] U.S. Cl. .......... 269/32

[58] Field of Search .......... 269/32, 27, 24, 285, 269/239, 228, 91, 93, 94; 308/6 R

[56] References Cited

U.S. PATENT DOCUMENTS

| | | | |
|---|---|---|---|
| 3,365,253 | 1/1968 | Haller | 308/6 R |
| 3,469,892 | 9/1969 | Langstroth | 308/6 R |
| 3,545,050 | 12/1970 | Blatt | 269/228 |
| 3,570,835 | 3/1971 | McPherson | 269/32 |
| 3,702,185 | 11/1972 | Blatt | 269/32 |
| 3,735,972 | 5/1973 | Blatt | 269/228 |
| 4,019,784 | 4/1977 | Ladin et al. | 308/6 R |
| 4,108,589 | 8/1978 | Bunch | 269/228 |
| 4,123,046 | 10/1978 | Madlener | 269/228 |
| 4,234,057 | 11/1980 | Nakane et al. | 308/6 R |
| 4,458,889 | 7/1984 | McPherson et al. | 269/32 |

*Primary Examiner*—Robert C. Watson
*Attorney, Agent, or Firm*—Lloyd M. Forster

[57] ABSTRACT

Air pressure actuated locking power clamp released from static loaded condition by air pressure no greater than locking pressure notwithstanding a differential smaller release pressure area due to piston rod of air cylinder. Highly pressurized needle bearings in straight track portions of the clamp which actuate links connected to a pivoted clamp arm are critical elements in providing unexpected low pressure release. Similar needle bearings in all loaded pivots of conventional toggle clamps provide 100% improvement in ratio of apply force to clamping force.

14 Claims, 12 Drawing Figures

FIG. 10
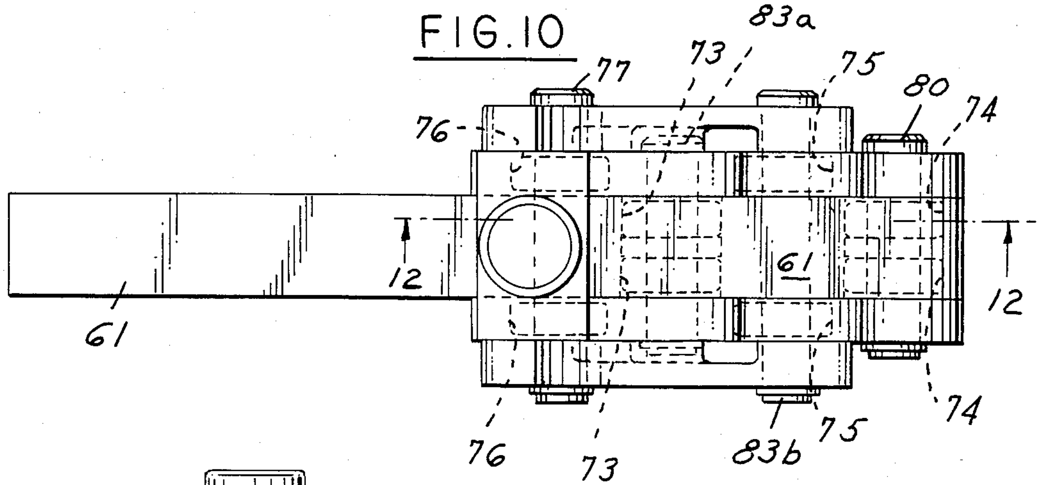
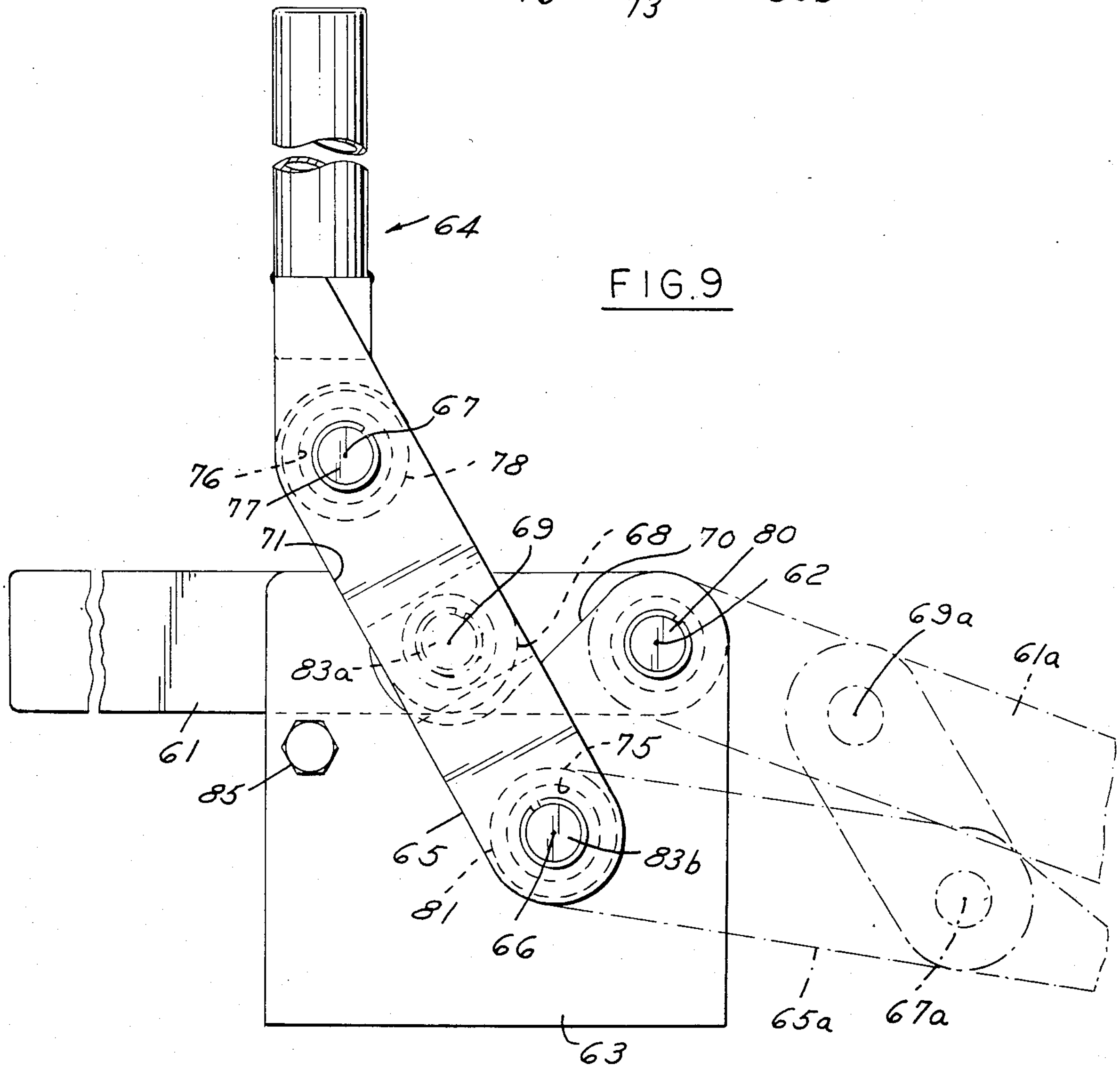
FIG. 9

LOCKING POWER CLAMP

RELATED APPLICATION

This application is a continuation-in-part of copending application Ser. No. 427,176 to be issued as U.S. Pat. No. 4,458,889 on July 10, 1984.

BACKGROUND OF THE INVENTION

Air pressure actuated power clamps have been used for many years which employ straight piston rod stroke between opposed straight reaction guide tracks in which bearings for one end of parallel links are driven by the piston rod the other ends of which are pivotally connected to a clamp arm having a spaced pivotal connection to the clamp body. Actuation of the links toward a right angle relationship of link pivots to the reaction track articulates the clamp arm towards its clamping position. When the clamp arm is adjusted to provide maximum clamping pressure on a workpiece at standard factory air pressure such as 80 p.s.i. any travel to center or slight overcenter to a positive stop of the clamp arm has been found in most commercial clamps currently available to require a release pressure exceeding the 80 p.s.i. apply pressure by as much, for example, as 20 to 30 p.s.i. Accordingly, since this may result in a locked up clamp which cannot be released by standard air pressure such clamps are normally operated with a limited travel of the piston rod to a linkage angle short of 90°, e.g. in the order of 85°, to assure that supply line pressure will always release the clamp. Such practice, however, does not assure that clamping pressure will remain engaged in the absence of actuating air pressure even though a self-locking friction angle is attempted since vibration of the workpiece may permit the component of release force to gradually urge the linkage to a release condition. While it may be tolerable to leave air pressure applied under conditions where the workpiece and clamp remain stationary near a supply line, there are many requirements in industry where the workpiece travels on a pallet, truck or platform having air operated power clamps which must remain clamped while traversing substantial areas in the plant. For many years the only solution to this working condition has been to employ portable air pressure tanks mounted on the moving work platform thereby providing means for maintaining clamp actuating air pressure throughout required transport of the clamped workpiece.

Notwithstanding long recognized need for a locking power clamp to permit the use of portable clamps on moving workpieces without having an accompanying portable air supply, a satisfactory solution has proved to be extremely elusive. Attempts have been made to decrease static friction at the center or overcenter position through lubrication and low friction bearing materials such as Teflon without success. In one known commercial clamp the combination of Teflon bearings and a spring element to accommodate overcenter locking has provided initially acceptable release forces but unacceptable durability under life cycle tests leading to unacceptable higher release values as wear occurred in the Teflon bearings together with problems of spring breakage from fatigue.

BRIEF SUMMARY OF THE PRESENT INVENTION

Applicants have found after extensive experimental testing a complete solution to the problem of providing a power clamp with positive center or slight overcenter locking which can always be released with no greater cylinder pressure than is employed in actuating the clamp to locking position. Indeed surprising and unexplained remarkable results have been obtained wherein consistently substantially *lower* release air pressures are required relative to available apply pressures e.g. in the order of 55 p.s.i. to release from a clamped condition which required 80 p.s.i. to apply notwithstanding release force reduced by the area of the piston rod. By employing special needle bearings having unusual proportions, as critical highly loaded track follower bearings engaging the opposed guide reaction tracks at the pivotal connection for the links passing to center or overcenter in the clamping operation, required results have been obtained which pass all life cycle durability and clamping force retention tests which industry requires. For example, in one durability test which required a 150 lb. clamping force at a given distance from the clamp arm pivot after five million cycles without clamp adjustment to compensate for pivot wear applicants construction retained 350 lbs. or more than double the minimum requirements.

A further remarkable unexpected result was discovered in comparing the performance of the clamp at the beginning and end of a five million cycle test where at the beginning a 950 lb. maximum clamping load was produced at 4¾" from the clamp arm pivot with 80 p.s.i. of pressure reaching a positive locking slight overcenter position which required a release pressure of 70 p.s.i., and at the end of the five million cycle test the clamp was able to produce 1450 lbs. of clamping pressure at the same pressure point with 80 p.s.i. of pressure and only 55 p.s.i. was required to release the clamp. Thus, the performance of the clamp both in efficiency of producing clamping pressure and minimization of release force drammatically improved after a five million cycle durability test.

The key feature of releasing from a positive slightly overcenter locked condition with no more, and actually less air pressure, than required to produce locking engagement was particularly surprising and unexplainable by applicants in view of their experience with plain steel bearings wherein an 80 lb. pressure was accompanied by a release pressure requirement in the range of 110 to 120 lbs. Such higher release pressure was consistent with conventional experience that static coefficient of friction, such as encountered in initiating release movement from applied clamp pressure, would be higher than dynamic coefficient of friction encountered in moving the clamp arm to its clamping position. Accordingly, it was a completely unexpected phenomena to find the apparent effective static coefficient of friction for the needle bearings employed to provide a reduction rather than increase relative to the moving coefficient of friction encountered during engagement.

More generally, in toggle clamps that may be either power or manually actuated and which do not necessarily involve straight reaction guide tracks, pivotal friction of the toggle linkage elements as clamp actuation approaches toggle alignment where maximum pressure is applied by the clamp arm, substantial force is required by application of the handle or other actuating element notwithstanding the increasing mechanical advantage reaching theoretical infinity as the toggle linkage reaches alignment of the toggle pivots. This is true whether the final clamping position is reached at or slightly overcenter as is normally the case to assure retention of clamping pressure under any operating condition which may include vibration favoring a slight overcenter final position.

In either case pivotal friction likewise involves substantial handle release force, normally somewhat higher than final clamp applied force, probably due to a somewhat higher static coefficient of friction involved in releasing the clamp from its locked clamping position.

The resistance to application of full clamping pressure will be greater where the resistance to application of clamping force involves some compression of the workpiece or otherwise yielding of the clamp engaging surface so that limitations in mechanical advantage are more critically involved as well as pivotal friction in approaching the aligned position of the pivots. Accordingly, limitations in the practical useful clamping load capacity arise not only from the strength of the elements required to exert clamping pressure but in the practical limitations of application force whether it be manual or power.

Further experimental application of the same needle bearings employed in the power clamps described above to an additional different model of toggle clamp disclosed that a 100% increase in efficiency of clamp capacity in terms of ratio of apply force to clamping force may be achieved through use of needle bearings at the respective pivots loaded by toggle linkage in applying clamping force.

BRIEF DESCRIPTION OF THE DRAWINGS

FIG. 9 is a side elevation of an alternative manually actuated toggle clamp incorporating needle bearing pivots;

FIG. 10 is a plan view of the clamp illustrated in FIG. 9;

With reference to FIGS. 1-3 the power clamp of the present invention comprises clamp head 10 actuated by power cylinder 11 adapted to move 90° clamp arm 12 through coupling 13, piston rod 14 and links 15 to the clamping position shown in full line relative to any base or worktable to which clamp head may be secured through any of the unnumbered multiple cross bolt holes illustrated in FIGS. 1 and 2. Clamp head 10 comprises two symmetrical forging body halves 19 connected by bolt 16 with spacer 17 and by bolt 18 passing through clamp arm 12. Square cross pin 22 seated in square recesses 23 in the respective body halves is provided with a stop shoulder 24 which serves as a spacer for the lower body halves as well as providing a stop surface 25 for abutting clamp arm surface 26 in clamping position. Nut 28 is staked at a tightened position against the shoulders of cross pin 22 which is dimensioned to provide free pivotal movement of links 15 and clamp arm 12 between guide surfaces 27 provided by the inner surfaces of the body halves. A spacer bushing not shown for bolt 18 also assures proper clearance.

Figure 7:
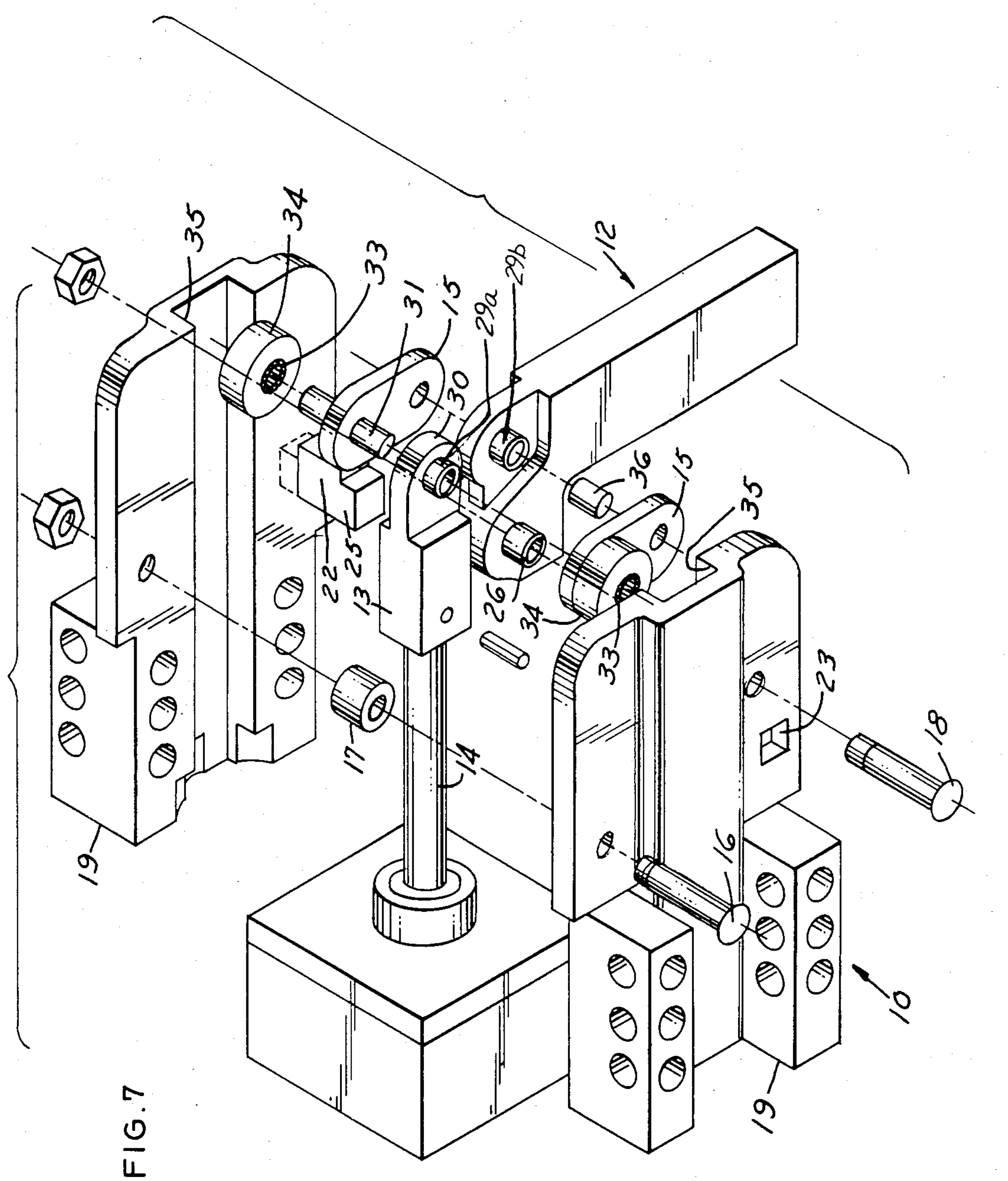
FIG. 7 is an exploded view of the power clamp illustrated in FIGS. 1, 2 and 3.

Linkage for actuating clamp arm 12 through piston rod 14 includes coupling 13 having reduced end extending between links 15 connected thereto by shaft 31 forming the inner race for spaced needle bearings 32 each having needles 33 and outer track follower race 34 engaging longitudinal slot track 35 in each of the forged halves 19 of clamp head 10. As best shown in FIG. 7, links 15 are pivotally connected at their lower ends by pivot pin 36 to a reduced end of clamp arm 12, bushings *29a* and *29b* being pressed into flush position in the respective reduced ends to pivotally receive respectively shaft 31, having ends pressed through links 15, and pin 36, having ends pressed into the lower ends of links 15.

In order to achieve locking of the clamp arm needle bearing 32 passes slightly overcenter (beyond right angle relation with pivot pin 36) relative to reaction guide track surface 35, e.g. approximately in the order of 0.010 to 0.020 of an inch in the case of link pivot spacing of 1⅛".

From the description thus far it will be seen that retraction of piston rod 14 from the locked condition of the clamp arm 12 shown in full line will pull bearing 32 and the upper end of link 15 through center to a release condition and cause arm 12 to pivot about bolt 18 through a maximum arc of 119° to a position shown by dotted line 37. In the case of an optional 180° arm such as shown by dotted line position 38 in its clamping position, retraction through a 96° maximum arc will move the arm to dotted line position 39.

Figure 1:
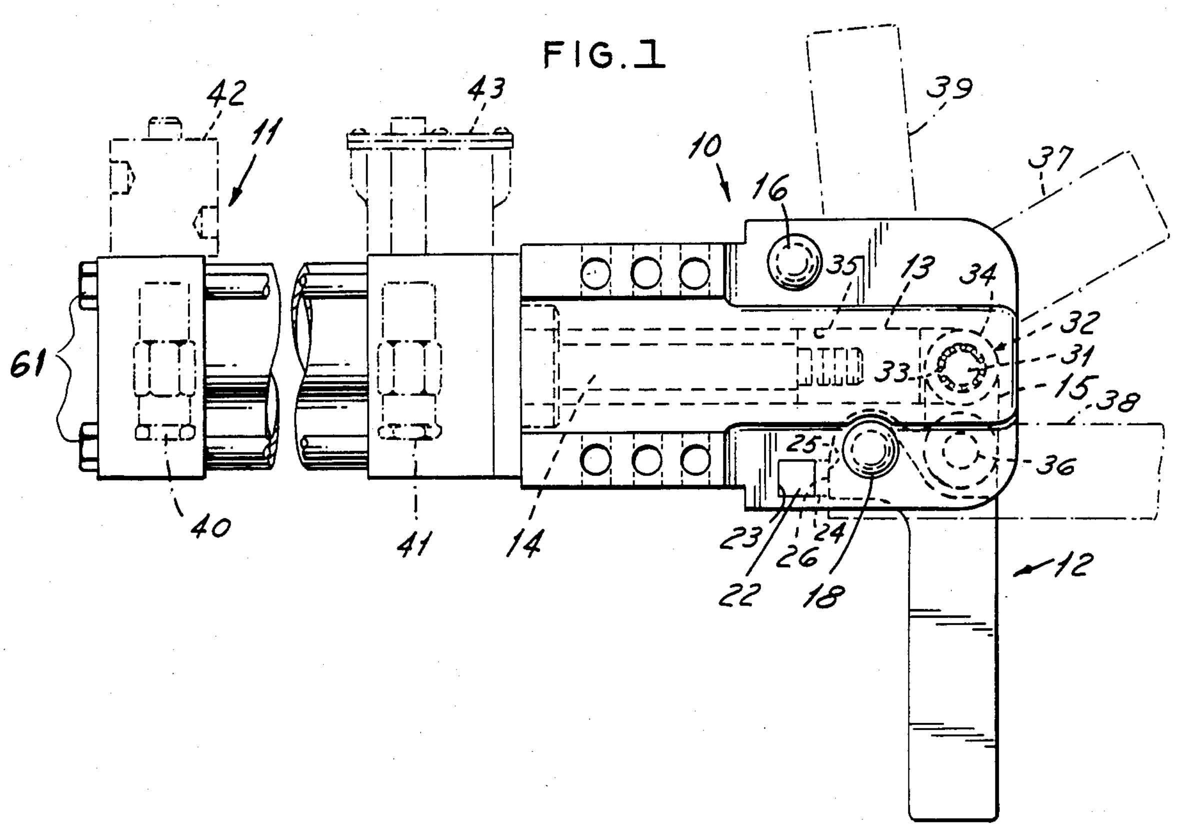
FIG. 1 is a side elevation of the power clamp of the present invention.
Figure 2:
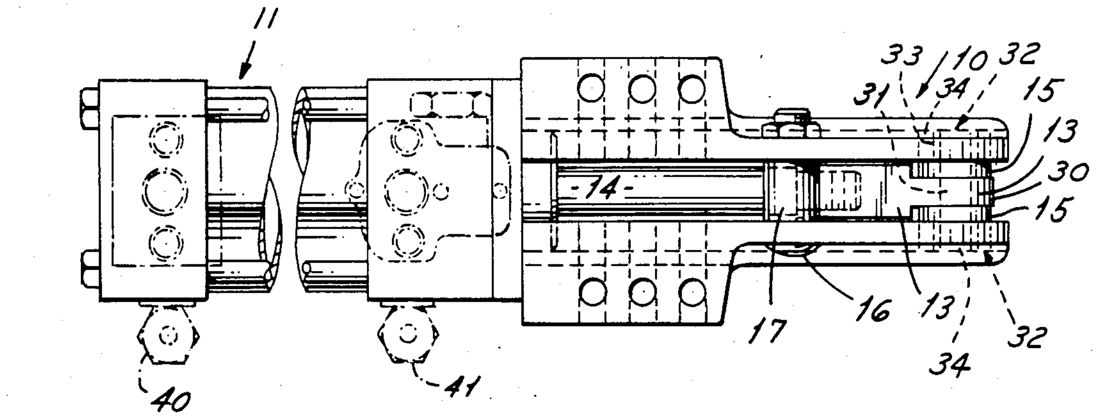
FIG. 2 is a plan view of the clamp.
Figure 3:
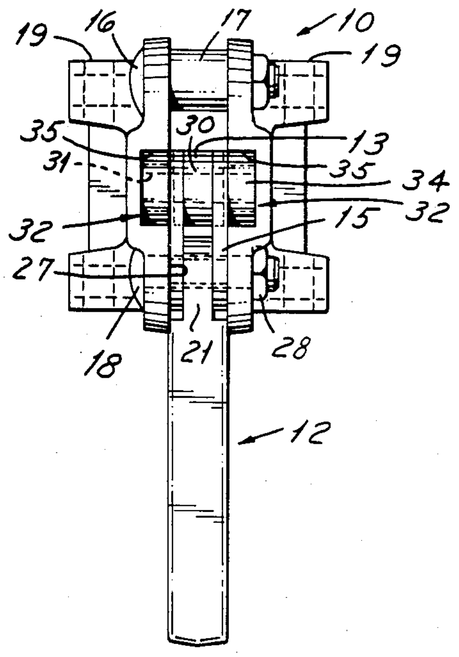
FIG. 3 is an end elevation of the clamp.

Cylinder 11 is suitably secured to the end of clamp head 10 by four external bolts 61. Optional flow control couplings for air supply at the cap end 40 and rod end 41 are shown in FIGS. 1 and 2 as well as air limit valve 42 and an alternative electrical proximity switch 43 for monitoring piston movement to physically sense and signal when the piston has reached a full stroke position.

Figure 4:
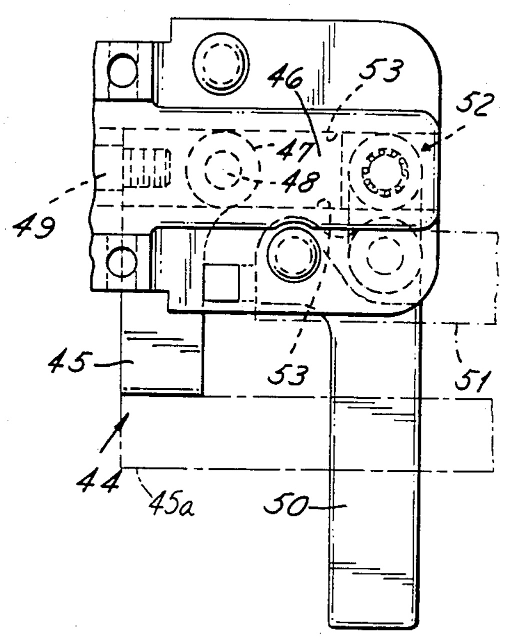
FIG. 4 is a fragmentary side elevation similar to FIG. 1 illustrating a modified embodiment incorporating an auxiliary clamp arm.
Figure 8:
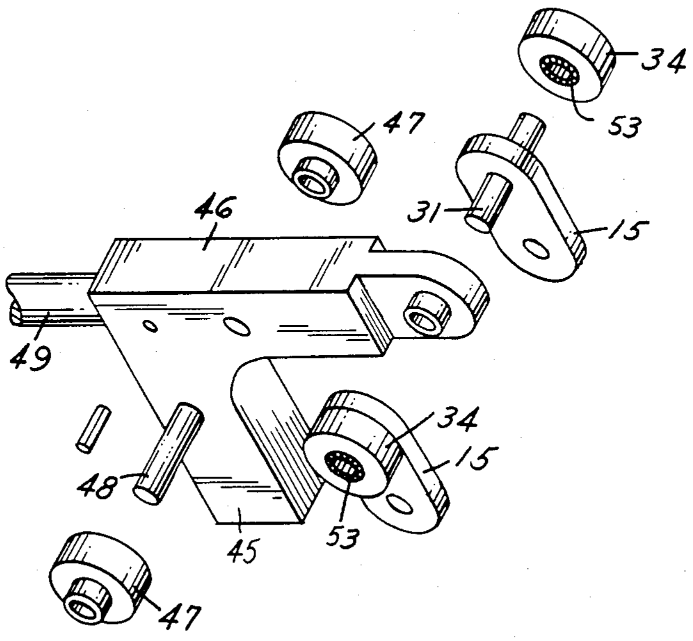
FIG. 8 is an exploded view of the pressure clevis illustrated in FIG. 4.
Figure 11:
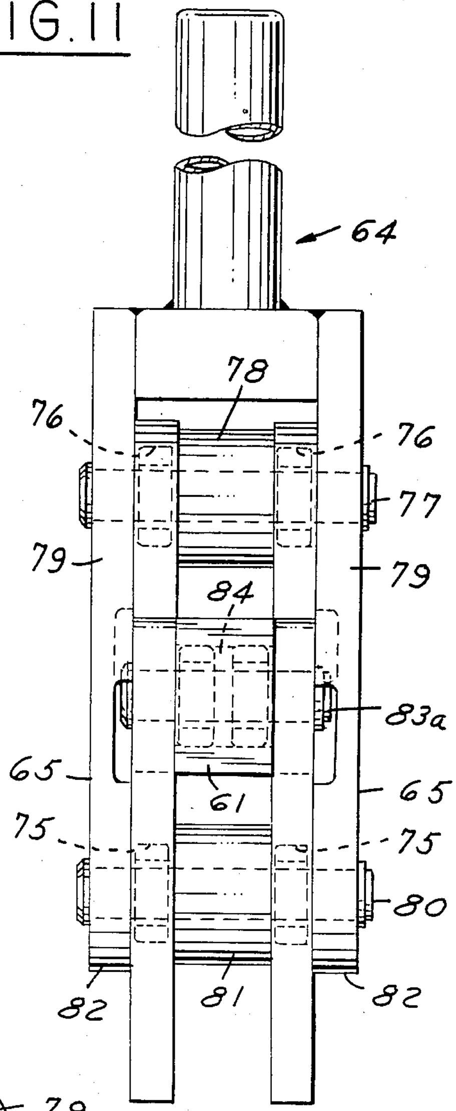
FIG. 11 is an end elevation of the clamp illustrated in FIG. 9.

With reference to FIGS. 4 and 8 an optional pressure clamp feature 44 may be employed by adding arm 45 to a lengthened piston rod coupling 46 having supplemental track engaging rollers 47 mounted on cross pin 48. With this optional feature the auxiliary clamp arm 45 will travel in linear relation with piston rod 49 toward a clamping relationship with pivoting arm 50, clamping pressure in this case being limited to the axial force which is applied to the piston rod. With this feature a workpiece may be clamped between pivoting arm 50 and supplemental arm 45 independent of any reaction base normally employed with a clamp arm such as 12 in FIG. 1. In such case the workpiece may be held manually in a position for clamp engagement upon piston actuation or it may be prepositioned on a base surface at a level appropriate for clamp engagement by arms 45 and 50, in which case the base could operate as a reaction surface for any physical operation while the workpiece is held from moving by the clamp arms. If the supplemental arm 45 is adapted with a right angle extended arm *45a* for parallel clamping relationship with an optional 180° arm 51, such limitation will not exist since the leverage of clamping force exerted against arm 45/45*a* will be absorbed by the spaced bearings of roller 47 and needle bearing 52 on the reaction track surfaces 53. As in the case of arms 45 and 50, a workpiece may likewise be directly clamped between optional arms 51 and 45*a*, shown in phantom in FIG. 4, with either manual or base surface appropriate prepositioning of the workpiece.

Figure 5:
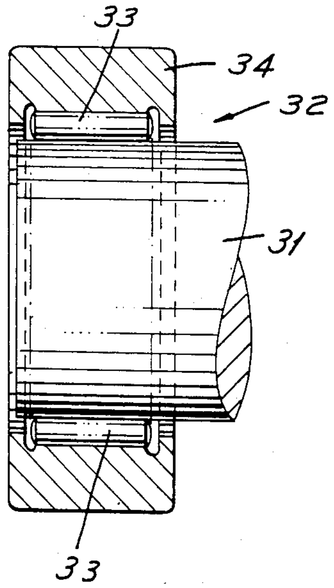
FIG. 5 is a sectional view of the needle bearing employed in the power clamp of the present invention.

With reference to FIG. 5 the sectional view of the needle bearing 32 indicates relative proportions of inner race shaft 31, needles 33 and outer race track follower 34.

Figure 6:
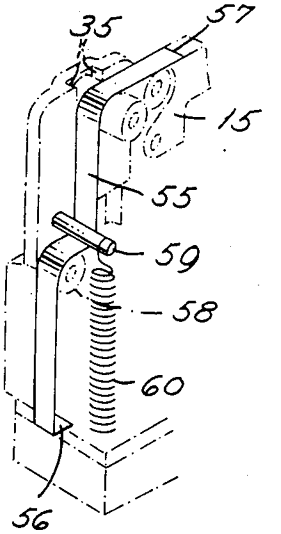
FIG. 6 is a perspective view of an optional track cover to minimize intrusion of dirt into track and bearing surfaces.

With reference to FIG. 6 an optional tape track cover 55 may be secured at its lower end 56 to the base of its upper end 57 to the clamp arm extending over the pivot links 15 covering track surfaces 35 and over a stationary roll 58 with slack taken up by a pin 59 and a pair of springs 60 to accommodate change in length during actuation of the clamp. Such provision serves to contribute to the life of the clamp by effectively excluding access of dirt and dust during operation.

Following is an example of specific values for component parts of a power clamp constructed in accordance with the present invention as illustrated in the drawings which has successfully passed an industry five million cycle test:

Pivot spacing of 1⅛" between pivots 31 and 36 and 1-" between pivots 36 and 18; needle bearings 32 with 1" o.d., 0.585" i.d., and 0.405" width for outer race 34, and ½" o.d. for shaft 31 (special uncataloged bearing of the Torrington Company providing needle contact width approximately ¼ of the o.d. produced under Part No. AG 57623 and having basic dynamic load rating of 1240 lbs. and basic static load rating of 1420 lbs.); links 15 made of 1045 steel heat treated to RC 45–50 with shaft 31 press fit in links constructed of 52100 bearing steel, RC 60–65 wth a micro-finish of RMS 16; bushings not shown constructed of 52100 bearing steel having RC 60–65 pressed in the narrow end of arm 12 as bearing for pin 36 and in end of coupling 13 as bearing for shaft 31; bushing not shown serving as a spacer on bolt 18 made of low carbon 11L17 having a carbo nitride surface to a depth of 0.005–0.010" heat treated to RC 60 having a slip fit as pivot for arm 12 made as a forging from medium carbon 1141 with no heat treat; sides 19 of body made of 1144 medium carbon forging steel with tracks broached and flame hardened for 2" area at end which is loaded by bearings 32; stop 22 constructed of low carbon 11L17 steel with 0.030–0.040" case having RC 55–60 hardness. In a five million cycle durability test applicant's power clamp so constructed was initially clamped at a distance 4.75" from pivot 36 with a 520 lb. load and without adjustment to compensate for wear finished with a load of 350 lbs., more than double the required 150 lbs. required by typical industry specifications.

Flow control valves 40 and 41 were employed to control speed and the unit was tested with both air limit valve 42 providing a position valve signal responsive to piston forward and back positions and with the equivalent proximity switch 43 providing electrical signals.

With reference to FIGS. 9–12 an alternative model hand actuated toggle clamp is illustrated, of a configuration sold by DeStaCo Division of Dover Corporation as Model No. 588, with needle bearings substituted for hardened and ground pivot pins fitted in hardened bushings as conventionally employed in this and other commercial toggle clamps.

Clamp bar 61 is pivotally connected at 62 between a pair of sandwich base plates 63, which may be welded in place, attached by side mounting, or clevis mounted, on any fixture detail not shown. Actuating handle 64 is constructed as an integral yoke having a pair of spaced arms 65 pivotally connected at 66 to base plates 63 and pivotally connected at 67 to a pair of links 68 in turn pivotally connected at 69 to clamp arm 61. Base plates 63 are recessed at 70 to accommodate links 68 which extend in the same plane and provide a stop surface 71 for limiting counterclockwise clamping travel of actuating handle 64 when pivots 66, 67 and 69 reach an aligned or slightly overcenter position.

Figure 12:
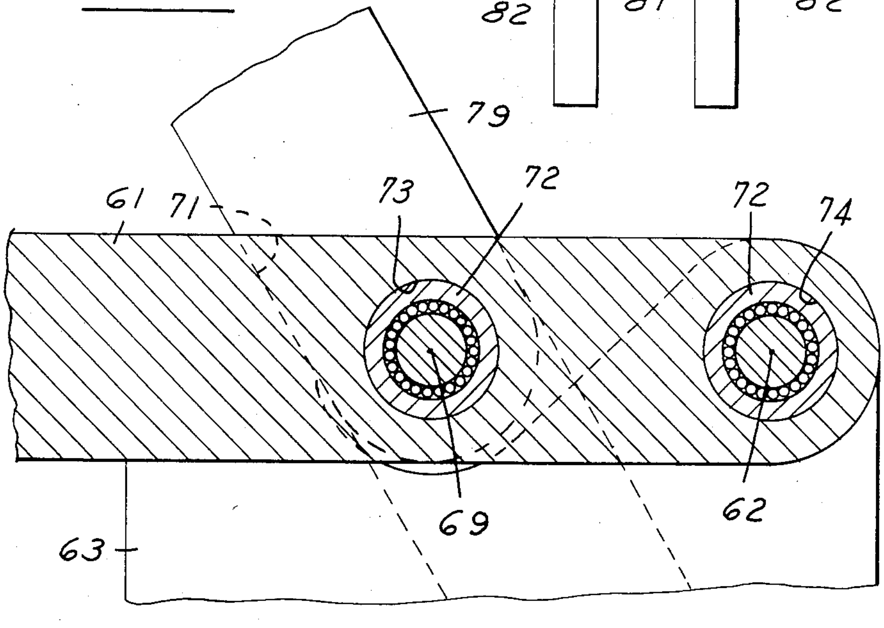
FIG. 12 is an enlarged sectional view taken along the line 12—12 of FIG. 10.

Upon opening, clamp arm 61 swings to wide open position 61*a* with pivot 69 reaching position 69*a*, handle pivot 67 position 67*a*, and handle 65 position 65*a*. Eight identical needle bearings of the type used in the foregoing power clamp embodiment, and shown at 72 in the sectional view of FIG. 12, are employed for the four pivotal connections 62, 66, 67 and 69. Four are located within apertures 73 and 74 in clamping bar 61, as best shown in FIG. 10, two are located in apertures 75 in base plate 63; and two in apertures 76 in links 68. Bearing pin 77 extends through the needle bearings for pivot 67, spacer bushing 78 and upper yoke 79 of handle 65. Pivot pin 80 extends through needle bearings for pivot 66, spacer 81 and lower ends 82 of handle yoke 65. A pair of pivot pins 83*a* and 83*b* extend through the respective needle bearings in bar 61 and links 68 at pivot 69 and base plates 63 at pivot 62. Needle bearings are located with outer races pressed into the relatively inner pivoting elements which will facilitate needle retention. Pivot pins are provided with a knurled surface adjacent the headed end with a press fit in the abutting element and either a slip or light press fit in the remote element. Single wider needle bearings may be used for pivots 62 and 69 in bar 61 in place of the pairs of needle bearings with spacers 84 interposed. Bolt 85, shown only in FIG. 9, engages a threaded hole in the remote base plate to adjust lateral guide support for bar 61.

In the same clamp configuration, substitution of needle bearings for conventional hardened pin and bushing bearings has produced a 100% improvement in the ratio of exerting clamping force to operator apply force, as shown in the following tabulation, where a standard "588 DeStaCo Toggle Clamp" was fitted with needle roller bearings at each of its four pivot points and designated "588-B". Measurements of exerting force were taken at 4½" from pivot point along the clamp arm while measurements of operator force were taken 10½" from lower pivot point measured vertically. Handle force was applied horizontally.

| Exerting Force | 588 | 588-B |
|---|---|---|
| 200# Lock | 25# | 15# |
| 200# Unlock | 45# | 20# |
| 400# Lock | 40# | 20# |
| 400# Unlock | 50# | 25# |

The importance of bearing friction in the highly loaded pivots of industrial toggle clamps has not heretofore been fully appreciated or understood. There are at least two contributing factors to the resistance of handle actuation as maximum clamping force is approached at the dead center alignment of toggle pivots. The angularity of pivot relationship before dead center alignment is reached includes a component of force incident to clamping load reaction, apart from pivotal friction, resisting actuating alignment of toggle pivots. Such component of force theoretically diminishes to a zero value upon reaching toggle pivotal alignment. While the geometric resistance is proportional to increasing clamp load, it is subject to offsetting reduction by decreasing angularity of pivotal relationship; on the contrary, resistance attributable to pivotal friction will continue to increase with pivotal loading from increasing clamp reaction force without any allieviating factor all the way to dead center pivotal relationship corresponding to maximum clamp pressure.

Thus, it is believed that while geometric resistance ultimately reduces to zero at the dead center of pivot alignment, pivot friction becomes the predominant ultimate factor in determining the effective ratio of apply force to exerting force and the corresponding ultimate efficiency of the toggle clamp in reaching maximum irreversible clamping pressures for rigidly holding the workpiece.

In any event, while ratios of applied to clamping forces are not subject to accurate analysis, emperical tests have demonstrated an improvement in the order of 100% through the use of anti-friction needle bearings at highly loaded pivots in accordance with the foregoing disclosure.

We claim:

1. Toggle clamp comprising clamp arm means, manual actuating arm means, pivoted toggle linkage means interconnecting said clamp arm and said actuating arm means, including anti-friction pivotal bearing means with rolling elements minimizing the ratio of actuating arm to clamp arm forces in locking and unlocking clamp arm pressure within the operational capacity of the clamp, and stop means limiting said actuating arm movement to a locked clamping position of said toggle linkage means, said toggle linkage means including said anti-friction pivotal bearing means at each of four parallel spaced axis pivotal connections, and including central clamp bar, and bifurcated base, side link, and handle elements, one of said pivotal connections extending between said bar and base, a second between said bar and side link a third between said base and handle, and a fourth between said handle and side link elements.

2. Toggle clamp of claim 1 including a pin extending through the rolling elements of each anti-friction pivotal bearing means, said pin directly engaging both bifurcated sides of one of each pair of pivotally connected elements.

3. Toggle clamp of claim 2 wherein one of each pair of pivotally connected elements straddles the other, and said pin directly engages both of the straddling sides of said one element.

4. Toggle clamp of claim 2 wherein one of each pair of pivotally connected elements straddles the other and said pin directly engages both of the straddling sides of said element, the sides of said straddling element confining said rolling elements against outward axial displacement.

5. Toggle clamp of claim 2 wherein a pair of side links straddle said clamp bar, and said pin directly engages both side links.

6. Toggle clamp of claim 2 wherein said pin directly engages handle sides straddling said side links.

7. Toggle clamp of claim 2 wherein said pin directly engages handle sides straddling said base.

8. Toggle clamp of claim 4 wherein said clamp bar extends in a central plane, sides of said base and said side links extend in common planes on either side of said clamp bar, and sides of said handle extend in planes outside of said common base and side link planes.

9. Toggle clamp of claim 8 including a spacer substantially equal to the width of said clamp bar extending between the side links at their pivotal connection with the handle, said spacer serving to confine said rolling elements against inward axial displacement.

10. Toggle clamp of claim 8 including a spacer between the base sides at their pivotal connection to said handle, said spacer serving to confine said rolling elements against axial inward displacement.

11. Toggle clamp of claim 1 wherein anti-friction pivotal bearing means are located in parallel spaced apertures in said clamp bar at said pivotal connections with said base and side link elements.

12. Toggle clamp of claim 11 including a pair of said anti-friction pivotal bearing means in each clamp bar aperture.

13. Toggle clamp of claim 12 including a spacer between each pair of said anti-friction bearing means.

14. Toggle clamp of any of claims 1 and 2–13 wherein the width of roller bearing contact with respective races of each bearing is approximately one quarter of the outer diameter of such bearing.

* * * * *